J. M. BROUSE.
LETTERING GUIDE.
APPLICATION FILED OCT. 12, 1917.
1,279,241.
Patented Sept. 17, 1918.
3 SHEETS—SHEET 1.
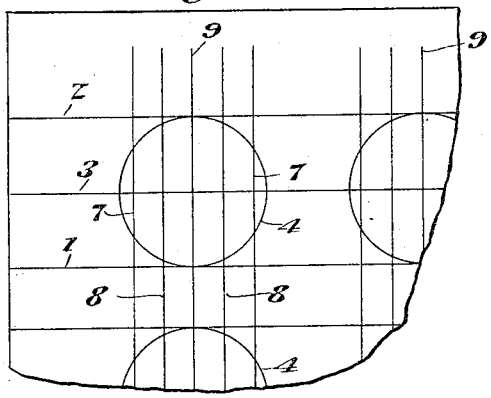
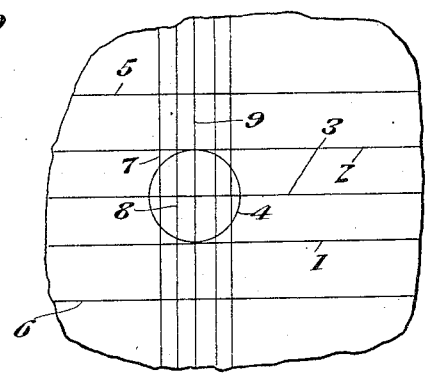
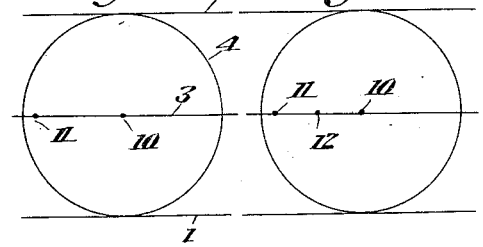
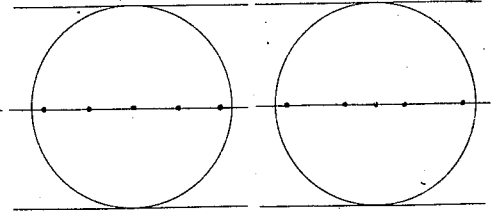
Inventor
John M. Brouse
Witness
By Victor J. Evans
Attorney

J. M. BROUSE.
LETTERING GUIDE.
APPLICATION FILED OCT. 12, 1917.

1,279,241.

Patented Sept. 17, 1918.
3 SHEETS—SHEET 2.

Witness
M. D. Slifer
N. L. Collamer

Inventor
John M. Brouse
By Victor J. Evans
Attorney

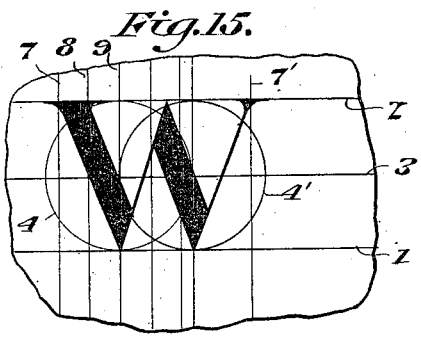
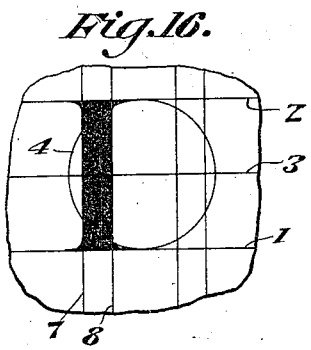
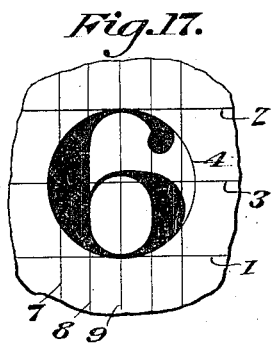
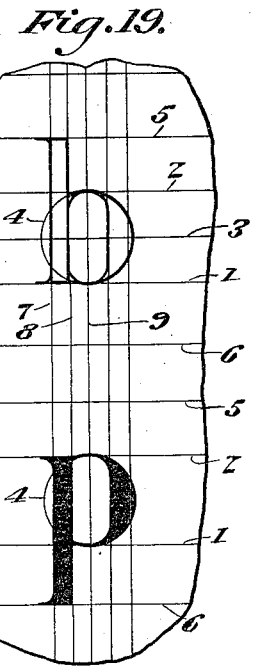
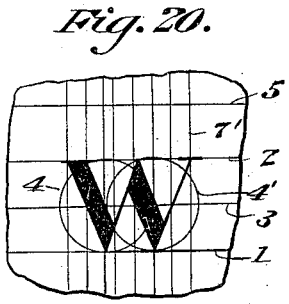
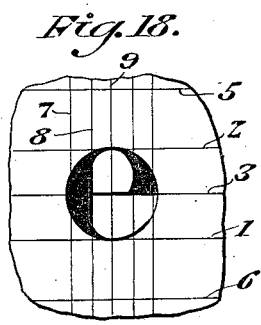
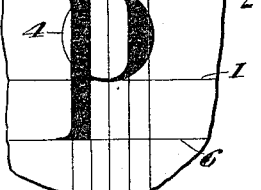

UNITED STATES PATENT OFFICE.

JOHN M. BROUSE, OF WADSWORTH, OHIO.

LETTERING-GUIDE.

1,279,241.　　　　　Specification of Letters Patent.　　Patented Sept. 17, 1918.

Application filed October 12, 1917. Serial No. 196,253.

*To all whom it may concern:*

Be it known that I, JOHN M. BROUSE, a citizen of the United States, residing at Wadsworth, in the county of Medina and State of Ohio, have invented new and useful Improvements in Lettering-Guides, of which the following is a specification.

This invention relates to educational appliances, and more especially to penmanship although it is intended for use by the painter rather than the writer. Its purpose is to provide a guide or chart for use in connection with a system for teaching the making of letters and figures, and as thus far developed I have adapted the guide for use in making roman letters as distinguished from italics or back-hand characters, script, text, or fancy characters. It may be employed to make what are known as "block letters" and either the roman letters or block letters may be solid or outlined, and with the exception of the general form of the letter it is not confined to details as the sign-writer may add embellishments by way of fancy strokes, shading, etc. The system and the guide are adapted to upper case, lower case, and figures, and of course the size and coloring of the characters is unimportant.

Full details as to the system and the manner of its use are set forth in the following specification and claim and illustrated in the accompanying claim wherein:—

Figure 1 is a diagram illustrating the guide in outline for the formation of an upper case letter or a figure, and Fig. 2 is a similar diagram showing the outline of the guide for the formation of a lower case letter.

Figs. 3, 4, 5, and 6 are diagrams illustrating the pointing off of the circle on one of the horizontal lines, and Figs. 7, 8, 9 and 10 are similar diagrams showing how the upright lines are drawn through said points and how the letter A would be constructed.

Figure 11:
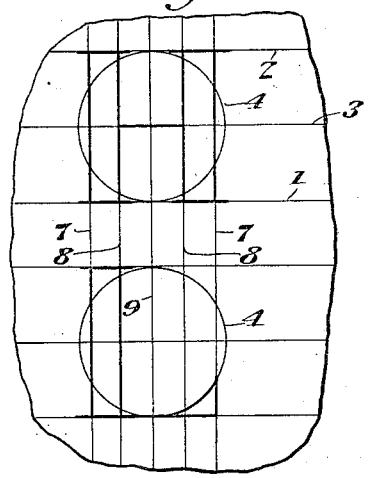
Figure 12:
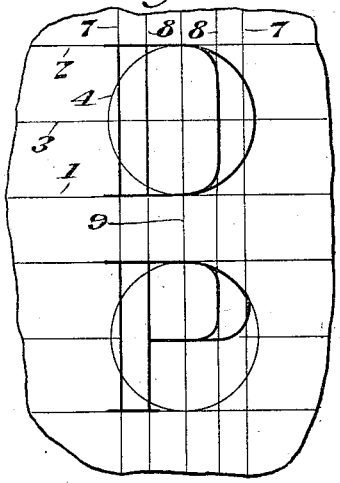
Figure 13:
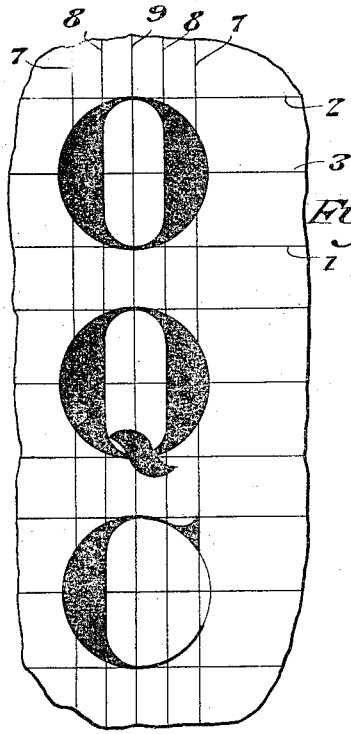
Figure 14:
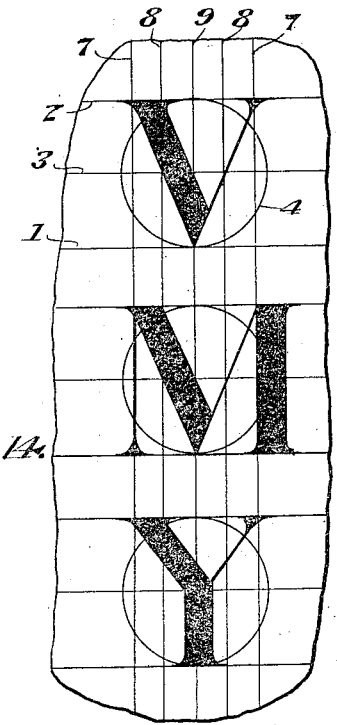

Fig. 11 designates the use of the guide for constructing so-called square letters, Fig. 12 for constructing part-round letters, Fig. 13 for constructing round letters, and Fig. 14 for constructing angular letters, while Fig. 15 is a diagram showing the use of the system as applied to an extra wide letter and Fig. 16 as applied to an extra narrow or single-limb letter.

Fig. 17 shows the system as applied to the formation of figures. Figs. 18, 19, 20 and 21 show the use of the system on lower case letters.

I may say at starting that my principle involves the use of a circle for every character made, one size of circle for the upper case letters and figures and another size of circle, probably about two-thirds of the first-mentioned circle in diameter, for the lower case letters, and the vertical diameter of the circle in all cases measures the height of the body of the letter. The bodies of all the figures and of all of the upper case letters include all the strokes excepting Q whose tail hangs below the line, whereas with the lower case letters their bodies will be confined to the limits of the circle but many rise above the head line and many hang below the base line and provision must be made for such extensions. Said head and base lines pass through the top and bottom of the circle, and I preferably also employ a medial line midway between the other two and parallel therewith and passing through the center of the circle; but for the lower case letters I add top and bottom lines respectively above the head line and below the base line so that the extensions of such letters as have them will be kept within limits. The paper or other surface onto which the letters are to be written or painted may be ruled transversely or horizontally with these lines, but it will be seen below that the disposition of the circles depends upon the letters to be used. Each circle is then intersected by an upright central line, and on each side thereof a limb line and a side line which cut the circle and are spaced from each other to define the width of the stroke constituting the straight upright limb of any character. The extent to which the side lines cut into the circle, rather than intersecting its extreme side tangentially, will define the entire width of the body of the letter which for good proportions should be a little less than the entire height of such body. If the characters are to be what is called "extended" the side lines will not cut so deep—if they are what is to be called "condensed" the side lines will be deeper or nearer the center. In like manner the spacing between the limb line and side line decides the width of any straight stroke or limb, so that if what are called "bold face" letters are to be written, this spacing will be considerable and the strokes will be rather thick or heavy. I find that a consistently relative proportion between the bodies of the upper case or capital letters and those of the lower case or small letters is brought about by making the circle of the lower-case guide about two-thirds the diameter of that of the upper-case guide, but the top line of the lower-case guide should be coincident with the head line of the upper-case guide so that the taller lower case letters will not rise higher than the top or heads of the upper case letters.

I might also say here that the manner of applying the guide to the paper on which the sign is to be written is not essential to the present invention. I have shown that the horizontal lines may be drawn clear across the sheet, and as it is obvious that a given word or words may contain several narrow letters and several wide letters, the circles and the upright lines through them will not always coincide vertically of the sheet and therefore must be drawn on the horizontal lines later. While I speak of "drawing" these circles and lines which would suggest that they may be made with a pencil or other hand implement directly on the paper, it is quite possible to form the circles and upright lines by other means, such, for instance, as by the use of a rubber stamp or stamps, one being of a proper size for the upper case letters and figures and the other of a proper relative size for the lower case letters. Then by using extremely pale or fugitive ink or coloring, the horizontal lines could be drawn with a pencil and the circles or upright lines stamped over them and properly spaced to provide guides for the letters of the word to be written, and eventually after the letters had been formed the guide would be erased or otherwise removed. The use of the stamp is only suggested, and I do not wish to be limited to the manner of forming the guide, no matter what language is used hereinafter. As another suggestion, if letters are to be painted on glass or other transparent material, it is clear the guides could be marked on a sheet of paper and applied to the rear face of the glass so that the workman or student could see through it and follow its guidance without marking the glass at all, and after he has written his line or made his letters the sheet with the guide could be removed from the rear face of the glass without touching its front face at all. With these preliminary suggestions, I will proceed to the specific manner of forming this guide.

Referring first to Figs. 1 and 2, there is shown a base line 1, a head line 2, and a medial line 3 half-way between them, all these lines extending clear across the sheet; and the circles 4 will be inscribed at proper intervals and drawn of proper size so that their tops and bottoms will respectively intersect the head and base lines. For the lower case letters there is also a horizontal top line 5 and bottom line 6, and for a word which includes both an upper case letter and some lower case letters the top line 5 of the latter should be coincident with the head line 2 of the former, and the smaller circles should be about two-thirds the diameter of the larger circle. All horizontal lines for letters of both size could be drawn clear across the sheet. The circles are next inscribed in their proper positions, according to the letters or characters to be written or painted. Through each circle is then drawn a pair of side lines 7, a pair of limb lines 8, and a central line 9 intersecting the true center of the circle; and, as above suggested, the side lines should cut the sides of the circle rather than being coincident with them and therefore tangential to the circle itself as are the head and base line—however, this rule is susceptible of modification according to the type of letter to be formed. Referring now to Figs. 3, 4, 5 and 6, through all of which I have carried the three horizontal lines, the true center of the circle is shown at 10, and may well be formed in the shape of a dot unless it is made by the inner limb of a pair of compasses or the like in drawing the circle. I next make a dot 11 on the medial line 3 at a little distance within the side of the circle, and in the present instance it is about one-fifth the radius of the circle, although this is susceptible of modification. Next, as seen in Fig. 4, I make a second dot 12 preferably midway between the dots 10 and 11. I then repeat these dots at the other side of the center as seen at Fig. 5, and care should be taken that the distance from 11 to 12 at one side of the circle is the same as the distance from 11 to 12 at the other side of the circle. In Fig. 6 I preferably show this distance greater, to produce a boldface letter, although it is still equal at the two sides of the circle. Next, as seen in Fig. 7, I form the upright lines, the side lines 7 cutting the circle, the limb-lines 8 being equally spaced from the side lines, and the center line 9 passing through the center of the circle, and all lines intersecting respectively the dots 11, 12, and 10. Yet these upright lines may not be drawn from top to bottom of the sign to be made, in case said sign has a plurality of lines upon it, because obviously the frequent use of wide and narrow letters and spaces between words will interrupt the upright alinement of letters.

For laying off the letter A on the chart or guide thus formed, reference is made to Figs. 8, 9 and 10. In Fig. 8 oblique lines are drawn from a point at the top where the central line intersects the head line, to points at the bottom where the side lines intersect the base line, then the stem of the letter is drawn to connect these lines as seen in Fig.

9, and finally one stroke of the letter is made heavy by drawing an additional oblique line as seen in Fig. 10. The so-called "feet" are finally applied as indicated by dotted lines in the last-named view. It will be observed that the distance between the head and base lines measures the height of the letter, and the distance between the two side lines measures its width excepting only for the little feet if they are employed. In other words, the height of the letter is the diameter of the circle, and the width of the letter is substantially the width of the circle, being less than its horizontal diameter only to the extent that the side lines cut it as suggested, and the width of the straight stroke or limb at the right of Fig. 10 is the distance between any side line and its contiguous limb line.

Fig. 11 shows this principle as applied to what I call the square letters, and I have used H and L as illustrated. It will be observed that the curved line at the inside of the foot of the L follows the circle which is used as a guide for its curvature. Fig. 12 shows the principle applied to what I call the part-round letters, and I have illustrated D and P. It will be observed that the upright limbs or strokes fill the space between the left hand side line 7 and limb line 8, whereas the curved limbs or strokes follow the circle at the outside and are coincident with the right-hand limb line 8 at the inside and therefore curved strokes are a little thicker at the center of their length. Fig. 13 shows the principle applied to what I call the round letters, and I have illustrated O, Q and C. Instead of being outlined or skeleton letters, these I purposely make solid. Note that the centers of the lengths of the curved strokes are, as before, a little wider or thicker than the distance between the side line and the contiguous limb line. This makes for grace and beauty in the finished product and is not inconsistent with straight strokes a little narrower throughout their complete length. In Fig. 14 the principle is illustrated as applied to what I call the angle letters, V M and Y being shown. It will be observed that the M is wider than the circle, and in Fig. 15 I have shown how the circle may be yet used for these wide letters, W being illustrated in this view. The circle is here repeated as at 4′ with its left side overlapping the right side of the original circle 4 to a certain extent, and although not so illustrated, the repetition of the circle at the right will repeat the upright lines and therefore the extreme right hand side line will cut through the right-hand circle 4′ where shown at 7′, and only the upper foot of the letter W will pass beyond it. In Fig. 16 I have shown how one of the single stroke letters may be made, the letter I being here used. Its stem or shank fills the space between the lines 7 and 8, after which the feet are added; and obviously the circle is useless. Experienced sign writers will at once observe that the occasional use of wide letters and narrow letters interrupts the equal lateral spacing of all letters, as the wide letters use more space than the horizontal diameter of a circle as seen in Fig. 15 and the narrow letters use less space as seen in Fig. 16, and this is the reason why the sheet may not originally be marked throughout its height with the upright lines, the same as it is marked throughout its width with the horizontal lines. This also is a good reason for applying the circle and the upright lines by means of a rubber stamp or similar movable marker, if not by hand, as the lateral disposition of the circles depends on the letters to be written. In Fig. 17 I have shown the principle applied to a figure, the numeral 6 being herein indicated.

In Fig. 18 the principle is applied to the formation of a lower case letter, e being here indicated. Note that it is as high as only the distance between the head and base lines 2 and 1 which are here closer together than the head and base lines of the upper case letters, and note further that the stem or crossbar at the center of the e is struck along the medial line 3 which is halfway between the head and base lines but does not correspond with the medial line of the upper case letters. In Fig. 19 is shown a part round lower case letter whose stem rises above the head line 2 to the top line 5, and a part round lower case letter p whose stem depends below the base line 1 to the bottom line 6. The latter is below the base line which is the same on both capitals and small letters, and the top line 5 should be coincident with the head line 2 of the capitals. Thus stems of lower case letters which rise above their bodies will be of equal height with the capitals or upper case letters to preserve the harmony of the word. An exception may be made with the lower case letter t, whose stem does not always rise so high, but even this is a matter of choice. In Fig. 20 I have shown the lower case letter w formed on the same principle, on circles 4 and 4′. In Fig. 21 I have shown one lower case letter (j) which occupies space both above the head line and below the base line, its dot being on the top line 5 and its tail extending down to the bottom line 6. This is a single stroke letter, and the circle is of course useless. I have employed this view to show how this letter might be shaded, although ornamentation is generally otherwise omitted.

In all the illustrations given, and in fact in forming the upper and lower case letters and the figures, most of the curves which occur can be struck on the circle or on lines paralleling it or diverging from it as in the case of the letter P in Fig. 12. Here the right-hand limb is a curved stroke whose outside is bounded by the circle and whose inside is coincident with the right hand limb line, but after passing substantially halfway down from the head line to the base line, this stroke must merge into a horizontal stem coincident with the medial line, and the mergence must of course be on graceful lines to preserve the harmony of the letter. To an extent the same rule would be followed with the letters B and R, but the circle will be found of great assistance to the beginner in all part-round letters, and of course it is of the highest utility in round letters as seen in Fig. 13. This view also emphasizes the grace produced by making the curved strokes a little wider than the straight strokes, and also by making the top and bottom strokes on single lines with the upright strokes shaded, as in the case of roman letters as counter-distinguished from block letters. However, the latter subject need not be touched upon at this point, as I designed this guide and system for the edification and assistance of the student or beginner and perhaps also for the use of the artisan whose eye is not true. I have found that, having once taught the beginner the fundamental rules for the formation of letters and other characters by this system, his skill and experience will soon enable him to discard the use of the circle and the upright lines, save for quite large letters or where extremely accurate work is required; and, after many years of experience, I find that the beginner can be taught by this system much more quickly and thoroughly than by any other with which I am familiar. It is quite possible that by inclining all hereinbefore called "upright" lines to the right, the system could be adapted to the formation of italic letters, or by inclining the lines to the left it could be used on backhand letters, but these details need not be amplified.

What I claim is:—

A character forming guide comprising a sheet, a circle described thereon, parallel lines applied to the sheet, one of the said lines being tangent with the top of the circle another tangent with the base of the circle and the other describing the diameter of the circle, a vertical line passing diametrically through the circle, side line passing across the circle and parallel with said vertical diametrical line and spaced at equal distances therefrom, and limb lines passing across the circle and parallel with said vertical diametrical line and spaced at equal distances therefrom.

In testimony whereof I affix my signature.

JOHN M. BROUSE.

Copies of this patent may be obtained for five cents each, by addressing the "Commissioner of Patents, Washington, D. C."